US008038083B2

(12) United States Patent
Junger et al.

(10) Patent No.: US 8,038,083 B2
(45) Date of Patent: Oct. 18, 2011

(54) FUEL INJECTOR

(75) Inventors: Dieter Junger, Stuttgart (DE); Nadja Eisenmenger, Stuttgart (DE); Christian Faltin, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 291 days.

(21) Appl. No.: 12/304,599

(22) PCT Filed: Apr. 27, 2007

(86) PCT No.: PCT/EP2007/054160

§ 371 (c)(1),
(2), (4) Date: Dec. 12, 2008

(87) PCT Pub. No.: WO2007/144229

PCT Pub. Date: Dec. 21, 2007

(65) Prior Publication Data

US 2009/0127356 A1 May 21, 2009

(30) Foreign Application Priority Data

Jun. 16, 2006 (DE) ......................... 10 2006 027 780

(51) Int. Cl.

| | |
|---|---|
| ***B05B 1/30*** | (2006.01) |
| ***B05B 9/00*** | (2006.01) |
| ***F02M 47/02*** | (2006.01) |
| ***F02M 57/02*** | (2006.01) |
| ***F02M 63/00*** | (2006.01) |
| ***F02M 69/46*** | (2006.01) |
| ***F02M 59/46*** | (2006.01) |
| ***F16L 55/04*** | (2006.01) |
| ***F04B 11/00*** | (2006.01) |
| ***F16K 31/02*** | (2006.01) |
| ***F16K 1/00*** | (2006.01) |

(52) U.S. Cl. .............. 239/585.1; 239/585.3; 251/129.15

(58) Field of Classification Search .... 239/585.1–585.5, 239/584, 88–92, 533.2, 124–127; 251/331, 251/129.17; 138/30, 31; 417/540; 123/467, 123/456, 447, 446
See application file for complete search history.

(56) References Cited

U.S. PATENT DOCUMENTS 4,481,699 A * 11/1984 Knapp et al. ............. 251/129.14
(Continued)

FOREIGN PATENT DOCUMENTS

DE 101 59 003 A1 6/2003
(Continued)

*Primary Examiner* — Jason Boeckmann
*Assistant Examiner* — Steven M Cernoch
(74) *Attorney, Agent, or Firm* — Ronald E. Greigg

(57) ABSTRACT

The invention relates to a fuel injector for injecting fuel into a combustion chamber, having a solenoid valve for controlling a mini-servo valve. A movable armature can be placed in a sealing fashion on a valve seat in a lower armature chamber, wherein in addition, the mini-servo valve is held in an injector body and seals a control line against a flat seat. By means of the flat seat, during an actuation of the solenoid valve, the control line can be relieved of pressure from a high fuel pressure to a return pressure into at least one return line. A mechanism for reducing pressure oscillations are provided in the at least one return line, which includes at least one diaphragm cell which is held in a recess and which is placed in fluidic connection with the at least one return bore. A fuel injector with the mechanism for reducing pressure oscillations is therefore created in the at least one return line which operates without a leakage flow and has a simple and effective function.

17 Claims, 6 Drawing Sheets

U.S. PATENT DOCUMENTS 5,520,215 A * 5/1996 Haboush ........................ 137/510
5,979,790 A * 11/1999 Gurich et al. .................... 239/88
6,321,776 B1 * 11/2001 Pratt et al. ...................... 137/312
6,336,595 B1 1/2002 Barbier
6,405,941 B2 * 6/2002 Ganser ............................ 239/88
6,425,532 B1 * 7/2002 Popp .......................... 239/132.5
6,558,127 B2 * 5/2003 Maruyama et al. .......... 417/44.1
7,124,738 B2 * 10/2006 Usui et al. ...................... 123/446
7,165,534 B2 * 1/2007 Usui et al. ...................... 123/467
7,165,535 B2 * 1/2007 Braun et al. .................. 123/467
7,303,091 B2 * 12/2007 Lombari ........................ 220/721
7,322,488 B2 * 1/2008 Lombari et al. .............. 220/721
7,513,240 B2 * 4/2009 Usui et al. ...................... 123/467
2003/0150930 A1 8/2003 Bauer et al.
2005/0019188 A1 1/2005 Usui et al.
2007/0079810 A1 4/2007 Usui et al.
2008/0289713 A1 * 11/2008 Munakata et al. .............. 138/26
2009/0185922 A1 * 7/2009 Inoue et al. ................... 417/540

FOREIGN PATENT DOCUMENTS

EP 1 036 932 A2 9/2000
EP 1 411 236 A2 4/2004
EP 1 500 811 A1 1/2005
EP 1 617 072 A2 1/2006

* cited by examiner

FUEL INJECTOR

CROSS-REFERENCE TO RELATED APPLICATION

This application is a 35 USC 371 application of PCT/EP 2007/054160 filed on Apr. 27, 2007.

BACKGROUND OF THE INVENTION

1. Field of the Invention

The present invention relates to a fuel injector.

2. Description of the Prior Art

Fuel injectors of the type of interest here serve to control the fuel that is injected into the combustion chamber in an internal combustion engine. They are constructed essentially of a magnet valve and a miniature servo valve, and they actuate a nozzle needle the opening and closing position of which is controllable by the magnet valve, so that injection bores in the injector are opened and closed for injection of the fuel.

A fuel injector of this kind is known from German Patent Disclosure DE 101 59 003 A1. In it, a fuel injector is disclosed which is embodied with a magnet valve for controlling the miniature servo valve, with an armature that can be placed in a valve seat in the lower armature chamber. The lower armature chamber communicates fluidically via bores with a control pressure chamber, and leakage quantities that occur via at least one return bore can be returned to a tank via the lower armature chamber. Upon closure of the valve seat by the armature, in order to avoid pressure fluctuations in the system of return bores below the valve seat, means are provided in the lower armature chamber for reducing these pressure fluctuations. The means for reducing pressure fluctuations include recesses to be machined in the lower armature chamber or fixtures in it, as well as increased volume of the return bores or of the lower armature chamber. Thus certain portions in both the magnet valve and the injection valve that are affected by the return of the leakage quantities can be embodied with enlarged volumes. Such an enlargement of the volume, with a defined outflow cross section, markedly reduces pressure fluctuations, but the requisite volume near the injector for the purpose is not available in the existing installation space.

Such pressure fluctuations are a substantial disadvantage of the known versions of fuel injectors; they can lead to a variable opening performance of the miniature servo valve and hence to fluctuations in the quantity of fuel injected. Pressure fluctuations that spread via connecting bores into the adjoining magnet valve chamber and magnet spring chamber cause waviness of the characteristic quantity curve, which cannot be reduced or avoided satisfactorily even by means of the enlarged fluidic volumes. Moreover, a high pressure level in the fuel return causes impermissibly high stresses in fuel return hoses or increased costs for high-pressure-proof hoses. In the leakage bore in the injector body, cavitation damage occurs, which is caused by pressure fluctuations and high flow speeds.

To avoid excessive pressures and the recoil behavior of the armature that impedes clean closing of the injection ports by the nozzle needle, an unclean injection of the fuel in the concluding phase of the opening cycle is brought about, but that causes poor emissions of the internal combustion engine.

From German Patent Disclosure DE 102 21 383 A1, pressure limiting devices for limiting peak pressure values occurring in the fluidic system of a fuel injector are known. These devices relate to a fuel injector which has a high-pressure fuel pump with a pump piston, which is driven in a reciprocating motion and defines a pump work chamber that communicates with at least one fuel injector, by which fuel is injected into the combustion chamber of the engine. Here, by an electrically actuated control valve, at least one connection of the pump work chamber with a relief region is controlled. By the pressure limiting device, if a predetermined pressure is exceeded in the pump work chamber, a connection of the pump work chamber with a relief region is opened up. The pressure limiting device has an elastically deformable diaphragm, which is acted upon by the pressure prevailing in the pump work chamber and which by its elastic deformation, if the predetermined pressure in the pump work chamber is exceeded, opens the connection of the pump work chamber with the relief region.

However, a disadvantage of the proposed pressure limiting device is the outflow of fuel into a relief region, which does not make it possible to make a closed system, or in other words to integrate the pressure limiting device with the closed fluidic system of return bores, without a leakage flow.

OBJECT AND SUMMARY OF THE INVENTION

It is therefore the object of the present invention to create a fuel injector with a mechanism for reducing pressure fluctuations in the at least one return line, which operates without a leakage flow and is both simple and effective in its function.

The invention includes the technical teaching that the mechanism for reducing pressure fluctuations include at least one diaphragm cell, which is received in a recess that is made to communicate fluidically with the at least one return bore.

By the integration of a diaphragm cell and the fluidic communication with the return bore, the advantage is attained that the maximum fuel pressure is limited to the level of the maximum diaphragm-tensing pressure, and as a result the pressure fluctuations can be reduced. Thus because of the volume received or output by the diaphragm cell, the flow speed in the return bore is limited, and hence smaller cross sections of the return bores can be implemented. If the pressure in the recess rises, then the internal volume decreases, because of the sagging of the diaphragm shells of the diaphragm cell. As a result of this effect, the maximum pressure during the pressure fluctuations is limited. If the fuel pressure in the system of return lines drops, then the diaphragm shells expand again because of the internal pressure inside the diaphragm cell as well as because of the elastic restoring force of the diaphragm shells, so that overall, smoothing of the pressure fluctuations and hence smoothing of the waviness of the characteristic quantity curve is attainable.

The return bores extend from the lower region of the flat seat into the region of the magnet valve, and the portion of the return bore in the direction of the magnet valve serves as a connecting line into the magnet spring chamber. Because of the reduced pressure fluctuations, the recoil behavior of the armature of the miniature servo valve can be reduced or avoided, which makes improved metering of the fuel quantity injected into the combustion chamber possible and optimizes the closing behavior of the fuel injector in the concluding phase of the injection cycle. Given the improved quantification of the injected fuel quantity that can thus be attained because the recoil behavior is minimized or avoided, improved combustion of the fuel is also attainable because of the optimized atomization of the fuel into the combustion chamber, resulting in reduced pollutant emissions.

An advantageous embodiment of the present invention provides that the recess is made in the injector body, so that the diaphragm cell can be integrated with the injector body. The recess for receiving the diaphragm cell is embodied as a circular indentation in the wall of the injector body, so that the diaphragm cell can be introduced simply from the outside into the recess embodied as an indentation. A connecting conduit enables the fluidic connection between the return bore and the recess, in order to create fluidic communication between the recess and the return bore.

Advantageously, the recess is sealed off in pressuretight fashion by a closure element, and in the recess next to the diaphragm cell, there is a prestressing element, which mechanically braces the diaphragm cell against the closure element along the joined circumference of the diaphragm shells. The closure element, in the form of a lid, closes off the recess from the outside in the injector body, and the closure element can be embodied as a circular disklike lid, which is secured mechanically in the injector body by a shaft securing ring and is sealed off fluidically in pressuretight fashion by a ring seal.

The prestressing element may be produced in the form of an elastic, cup-springlike, circular disklike element from a thin sheet-metal material, so that the pressure cell is braced in the region of its circumference against the inside of the closure element by the prestressing element. The diaphragm cell is constructed of two circular diaphragm shells, which are joined to one another radially all the way around in pressuretight fashion.

The joining connection may advantageously be embodied as a welded connection, with the diaphragm cell positioned radially and prestressed radially all the way around in the region of the weld seam of the two diaphragm shells, between the prestressing element and the inside of the closure element. As a result, upon a pressure drop in the interior of the recess, the welded connection between the two diaphragm shells of the diaphragm cell is relieved.

A further exemplary embodiment of the invention provides that the recess for receiving the diaphragm cell is received in a separate damper housing, and the damper housing is disposed on the injector housing and communicates fluidically with the return bore. Depending on the geometric conditions in the construction space of the fuel injector and because of the lack of integratability of the diaphragm cell with the injector body, the embodiment of the mechanism for reducing pressure fluctuations in a separate damper housing affords the possibility of disposing the diaphragm cell outside the injector body and of causing the recess, in which the diaphragm cell is received, to communicate fluidically with the system of return bores. In a manner similar to the recess embodied in the injector body, the damper housing includes an interior which is embodied, by a closure element, as a closed recess for receiving the diaphragm cell, and stops are provided, which receive and radially center the diaphragm cell on the circumference of the weld seam. On both the closure element and on the stop itself, stop faces are provided, which limit the stroke of the diaphragm shells of the diaphragm cell. Hence an overload, that is, a plastic deformation of the diaphragm shells, can be avoided. In this exemplary embodiment of the damper housing, the prestressing element is embodied adjustably, and thus the stop that is integrally formed onto the prestressing element is adjustable.

Advantageously, the circular disklike diaphragm shells have a concentric wave structure, in order to increase the resilience of the diaphragm shells. As a result of the wave structure, the value of the waviness of the characteristic quantity curve can be increased because of the lower resilience and hence the more-expanded elastic region, in order to maximize the maximum volumetric difference between a maximum pressure and a minimum pressure inside the recess. The volumetric difference pertains to the maximum and minimum volumes of the interior of the diaphragm cell. The wave structure extends concentrically about the center axis of the circularly embodied diaphragm cell and can for instance include four crests and troughs. With regard to the disposition of the diaphragm shells performing the diaphragm cell relative to one another, the possibility is afforded on the one hand of disposing the two circular disklike diaphragm shells for forming the diaphragm cell mirror-symmetrically to one another, so that the wave structure of the diaphragm shells extends counter to one another, and the diaphragm cell has a symmetrical embodiment. Conversely, it is also possible to dispose the two circular disklike diaphragm shells for forming the diaphragm cell parallel to one another, or in other words in the same direction to one another, so that the wave structure of the diaphragm shells extends in the same direction, and the diaphragm cell has an asymmetrical embodiment.

In the first case with the diaphragm cell embodied symmetrically, the diaphragm shells can be embodied identically, making for only very little variation between. In the disposition facing one another, the diaphragm shells can be welded, so that because of its symmetry the diaphragm cell does not require a preferential installation direction. Conversely, because of the symmetrical disposition of the diaphragm shells, minimal spacing is obtained, which leads to minimal thickness of the diaphragm cell and which includes a relatively small volume inside the diaphragm cell.

However, it is known that in the case of a relatively small volume inside the diaphragm cell, the final pressure for a given absorption volume, that is, the volumetric difference at maximum pressure and minimum pressure inside the return bore, rises only slightly when the outset volume is large. The diaphragm cell, which is limited in its outside diameter by the installation space, however, under service life conditions can receive only a limited absorption volume. From the typical external pressure/intake volume characteristic curve of the present fuel injector, it can be learned that the absorption volume demand drops with increasing external pressure. Reducing the outset volume produces a steeper characteristic curve of the external pressure over the absorption volume, and as a result, for a given absorption volume, a higher external pressure can be attained. As a result, even at small absorption volumes, safe and reliable function is attained. This makes it possible for the contour of the diaphragms in the entire spring region to be closely spaced because of an asymmetrical disposition of the diaphragm shells. Because of the small initial volume of the diaphragm cell and the resultant steeper pressure/volume characteristic curve, the contact pressure which causes the diaphragm cell to bulge outward when the external pressure drops decreases very quickly, reducing the load on the diaphragm shells and on the weld seam both in the unassembled state and when the diaphragm cell is not in operation.

A further advantageous embodiment of the present invention provides that the diaphragm cell is filled with helium and has a gas pressure which is greater than the return pressure in the return line or in the recess communicating with the return line. If as the gas that fills the diaphragm cell is selected to be helium, then the tight welding of the diaphragm shells is possible more safely and reliably in process terms and at the same time leads to more favorable properties with regard to changing the gas status. Helium has a high adiabatic exponent, and in highly dynamic events the result is a steeper pressure increase characteristic curve compared to the isothermic fundamental design.

Advantageously, the diaphragm cell has a stroke limiter, which is placed on the inside in the diaphragm cell. The stroke limiter has hoop elements, which are disposed meshing with one another, so that they limit both diaphragm shell sagging that moves the diaphragm shells together and diaphragm shell sagging that moves the diaphragm shells apart. The hoop elements can be welded into the diaphragm shells on the inside and have a C-shaped profile structure with each meshing with the other diametrically opposite. If the diaphragm shells bulge outward, then the sagging motion of the outward bulge is limited by meshing of the C-shaped profiles of the hoop elements, and the hoop elements have a height above the inside of the diaphragm shells that likewise limits sagging of the diaphragm shells inward. Thus by simple means, the possibility is created of both limiting the stroke in the form of sagging inward and bulging of the diaphragm shells outward, without providing external elements on the diaphragm cell. The hoop elements in each diaphragm shell can be embodied identically to one another, so as to minimize the variation among parts in this case as well, and once again an asymmetrical embodiment of the elements of the stroke limiter inside the diaphragm shells is possible.

BRIEF DESCRIPTION OF THE DRAWINGS

Further provisions that improve the invention are described in further detail below jointly with the description of preferred exemplary embodiments of the invention, in conjunction with drawings, in which.

DESCRIPTION OF THE PREFERRED EMBODIMENTS

Figure 1:
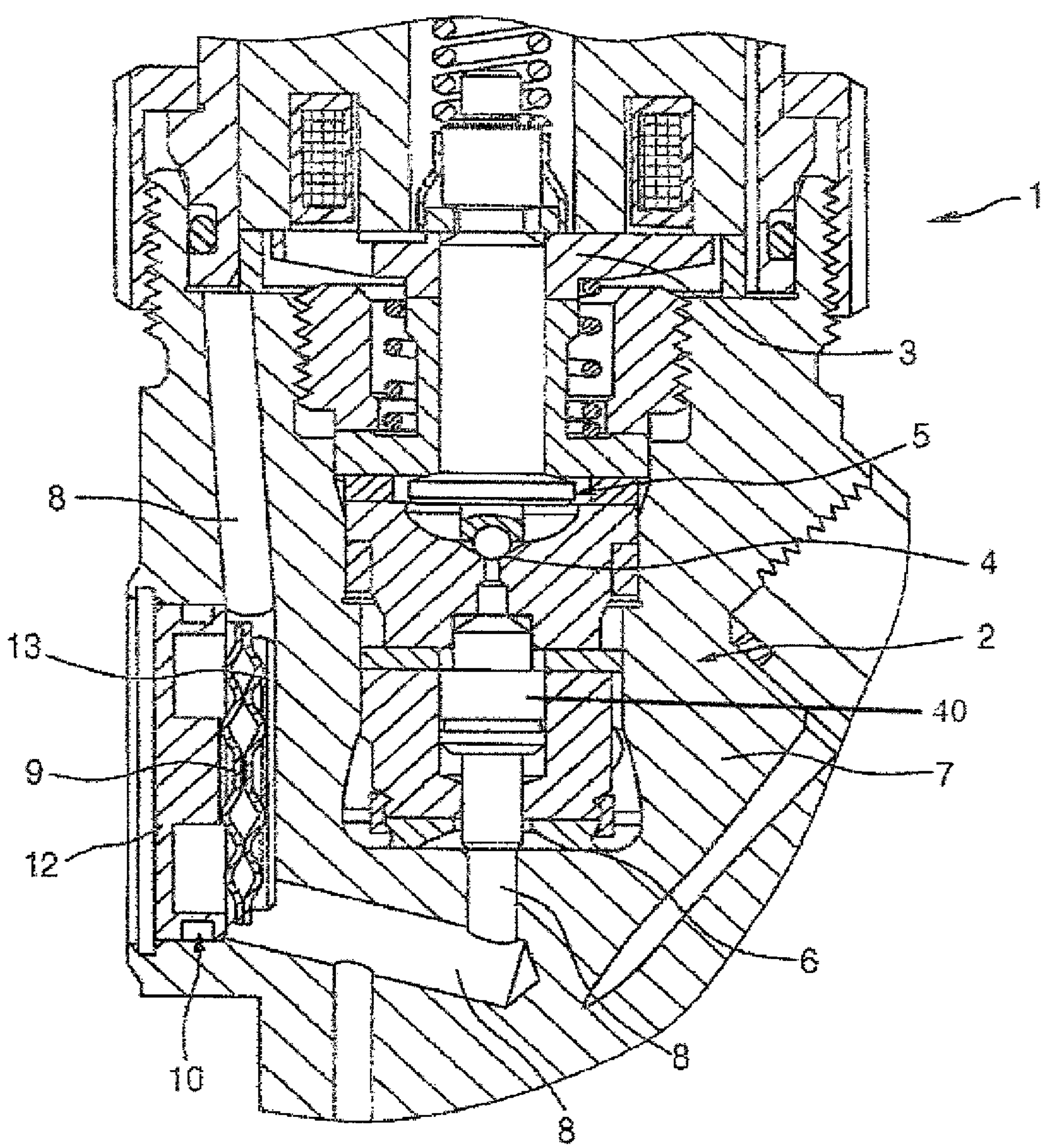
FIG. 1 is a cross section of a fuel injector with means for pressure limitation, and the means are embodied as a diaphragm cell which is integrated inside the injector body.

The fuel injector shown in FIG. 1 includes both a magnet valve 1 and a miniature servo valve 2. The magnet valve 1 includes both an armature 3 and a valve seat 4, and the latter separates an armature chamber 5 from a control chamber of the miniature servo valve 2. When current is supplied to the magnet coil of the magnet valve 1, the armature 3 moves vertically upward, so that the valve seat 4 in the lower armature chamber 5 opens. This valve seat 4 is in turn in fluidic communication, via one or more bores, with a control pressure chamber of the miniature servo valve 2. Upon opening of the valve seat 4, the pressure in the control pressure chamber of the miniature servo valve drops, and fluid flows from there via the bores in the direction of the valve seat 4 into the lower armature chamber 5. When the pressure in the control chamber is dropping, the nozzle needle (not shown here) of the fuel injector, which is constantly exposed to a high fuel pressure acting in the opening direction, is set into motion, and as a result the injection bores are opened, and the fuel injector can inject fuel into the combustion chamber. Return bores 8 are made in the injector body 7, and the system of return bores 8 adjoins a flat seat 6, and as a result of the opening and closing motion of the flat seat 6, pressure fluctuations can occur inside the return bore 8. The return bores therefore communicate fluidically with a recess 10 and act on a diaphragm cell 9 which is placed inside the recess 10. The recess 10 is disposed on the outside of the injector body 7 and is closed off in pressure tight fashion by means of a closure element 12. If the injector at the flat seat 6 of the miniature servo valve 2 now relieves the control line 40 from rail pressure to return pressure, then the result first is a high volumetric flow inside the return bore 8. This flow is carried onward to the recess 10, so that the diaphragm cell 9 is subjected to pressure and the diaphragm shells are made to bulge inward. As a result, the internal volume of the diaphragm cell 9 decreases, and pressure peaks that occur inside the return bores 8 are reduced. Conversely, if the pressure inside the return bore 8 decreases, then the diaphragm shells of the diaphragm cell 9 expand again, so that overall, the pressure fluctuations are smoothed. The diaphragm cell 9 is disposed between the closure element 12 and a prestressing element 13, which press the diaphragm shells of the diaphragm cell against one another in order to relieve the weld seam between the diaphragm shells.

Figure 2:
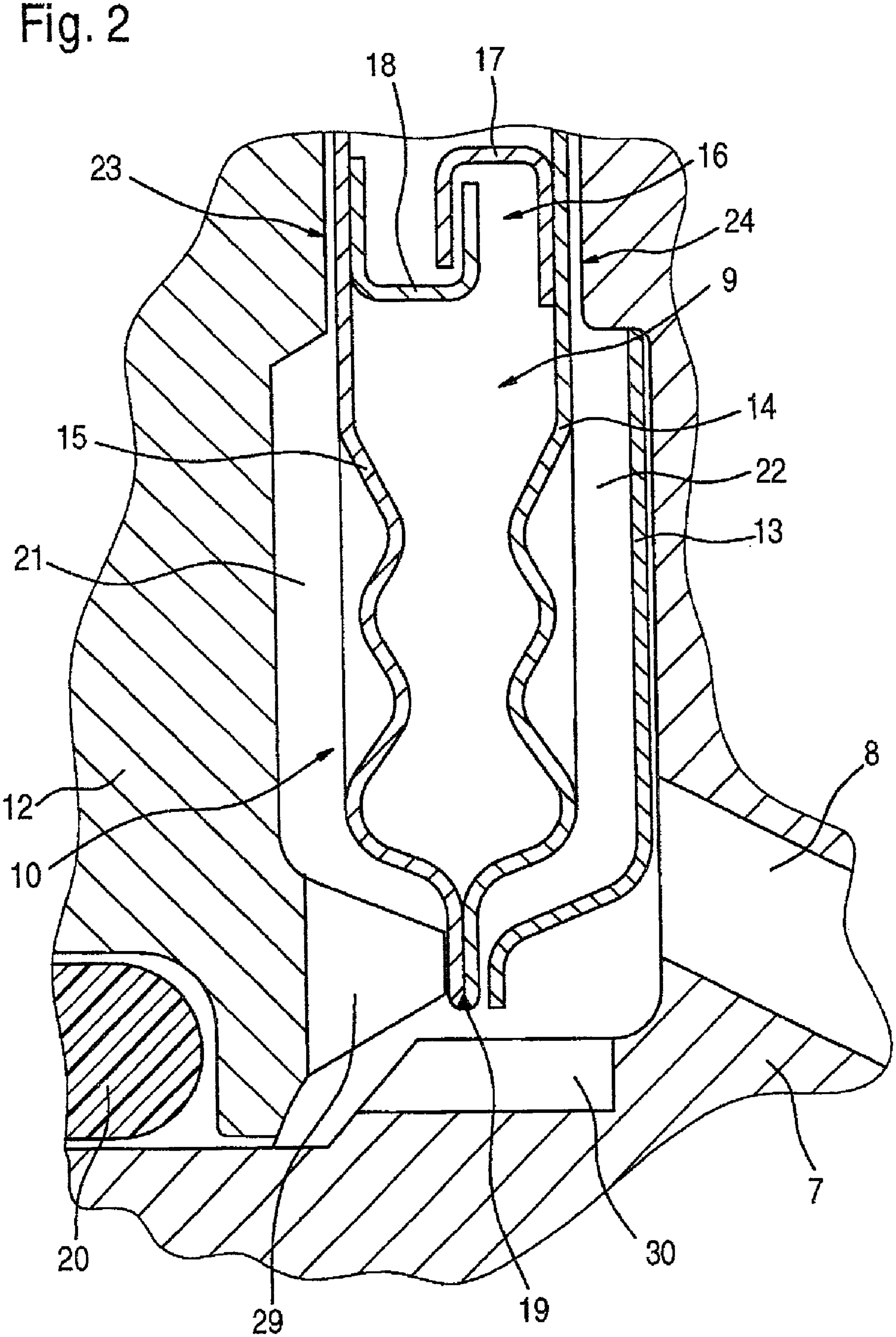
FIG. 2 is a cross section of a detail of the diaphragm cell of FIG. 1 which is integrated inside the injector body.

FIG. 2 shows an enlarged detail of the recess 10 inside the injector body 7. Via the return bore 8, the recess 10 communicates with the region below the flat seat (see FIG. 1). The diaphragm cell 9, which is embodied by a first diaphragm shell 14 and a second diaphragm shell 15, is disposed inside the recess 10. If the fuel now flows through the return bore into the recess 10, then first it reaches a first chamber 21, which is possible because of recesses 29 and 30 inside the injector body 7 and the closure element 12, respectively. A second chamber 22 is likewise subjected to fuel pressure and communicates directly with the return bore 8. If the pressure inside the chambers 21, 22 now rises, then the diaphragm shells 14 and 15 bulge inward toward one another, so that the volume inside diaphragm cell 9 decreases. The sagging of the diaphragm shells 14 and 15 is limited by a stroke limiter 16, which comprises a first hoop element 17 and a second hoop element 18. The hoop elements have a C-shaped profile, so that they each in diametrically opposite directions meet the inside of the diaphragm shells 14, 15 and thereby limit the reciprocating motion. Conversely, the hoop elements 17 and 18 mesh with one another when the pressure in the chambers 21, 22 drops, and the diaphragm shells 14 and 15 bulge outward. The diaphragm cell 9 is fastened in place between a prestressing element 13 and the closure element 12, and the fastening is effected radially all the way around at the level of the weld seam 19, in order to relieve the weld seam because of the prestressing between the prestressing element 13 and the closure element 12. For the sake of clearer illustration, the prestressing element 13 is shown in FIG. 2 in a floating, non-prestressed state. The closure element 12 is sealed off from the outside of the injector body 7 by means of a sealing element 20, which for instance comprises an O-ring. To create a limitation in the bulging motion of the diaphragm shells 14 and 15, stops 23 and 24 are provided in both the injector body 7 and the closure element 12, and these stops are struck by the diaphragm shells 14 and 15 when the diaphragm shells 14, 15 bulge outward. Thus the prestressed stops 23, 24 of the stroke limiter define the release pressure and limit the outward sagging of the diaphragm shell. Both the inner stroke limiter 16 and the outer stroke limiter with the stops 23 and are both shown in FIG. 2 in order to show them simultaneously, but in an actual realization of the arrangement, only one of the two stroke limiters is sufficient. The stops are formed selectively by the housing 7 and the closure element 12 or by the prestressing element 13 and a receiving element 28 (see FIG. 3).

Figure 2A:
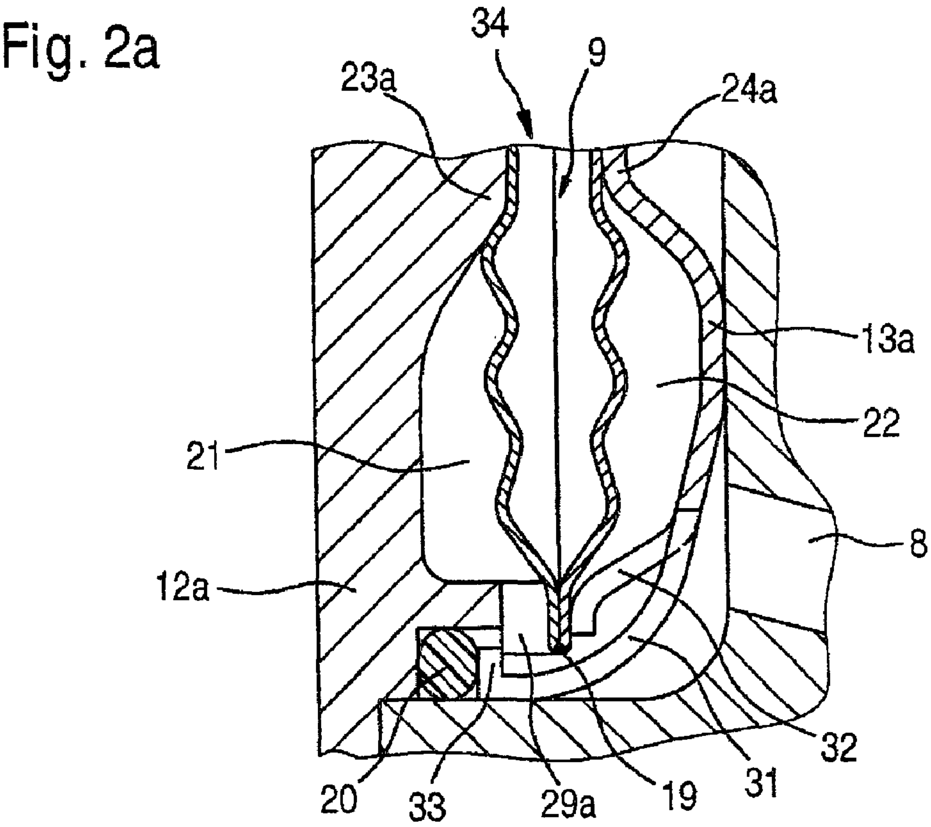
FIG. 2*a* is a cross section of a detail of the damper unit in a further exemplary embodiment.

FIG. 2*a* shows a further exemplary embodiment for receiving, limiting and prestressing the diaphragm cell 9. The prestressing element 13*a* has at least three deployable legs 32, which by elastic prestressing both relieve the weld seam 19 and simultaneously keep the diaphragm cell 9 in its position. By means of the deployable legs 32, a recess is formed in the enclosure 31, as a result of which the chamber 22 communicates directly, and the chamber 21 communicates via the recess 29*a,* with the return bore 8. On the end toward the closure lid of the enclosure 31, a locking means 33 is embodied, which preferably engages a groove for the sealing ring 20 in the closure element 12*a* and establishes a positive-engagement connection. A stop 24*a* is embodied on the prestressing element 13*a* and cooperates with the stop 23*a* embodied on the closure element 12*a* and takes on the function of both release pressure prestressing and stroke limitation. The locking means 33 is secured in the recess 10 by the limitation of the enclosure 31. The diaphragm fastening that is independent of the injector body 7 makes a precise adjustment of the prestressing pressure and the release pressure and a precise outward stroke limitation possible. The damper unit 34 produces high process safety and reliability, since the assembly is not done blind, there are no colliding structures are present in the injector body, and a missing diaphragm cell 9, for instance, can be reliably recognized. The comparatively vulnerable diaphragm cell 9 is protected in the damper unit 34 and can be checked independently. The damper unit 34 comprises the closure element 12*a*, the diaphragm cell 9, the prestressing element 13*a*, and the sealing element 20 and is received in the recess 10 of the injector body 7 in pressuretight fashion with respect to the outside, and the diaphragm cell communicates fluidically on all sides with the return bore 8. The circular disklike prestressing element 13*a* takes on both the task of prestressing for relieving the weld seam 19 and the function of the release pressure prestressing and stroke limitation. The elastic prestressing is effected by means of at least three deployed regions, which are located near the weld seam on the diaphragm cell.

Figure 3:
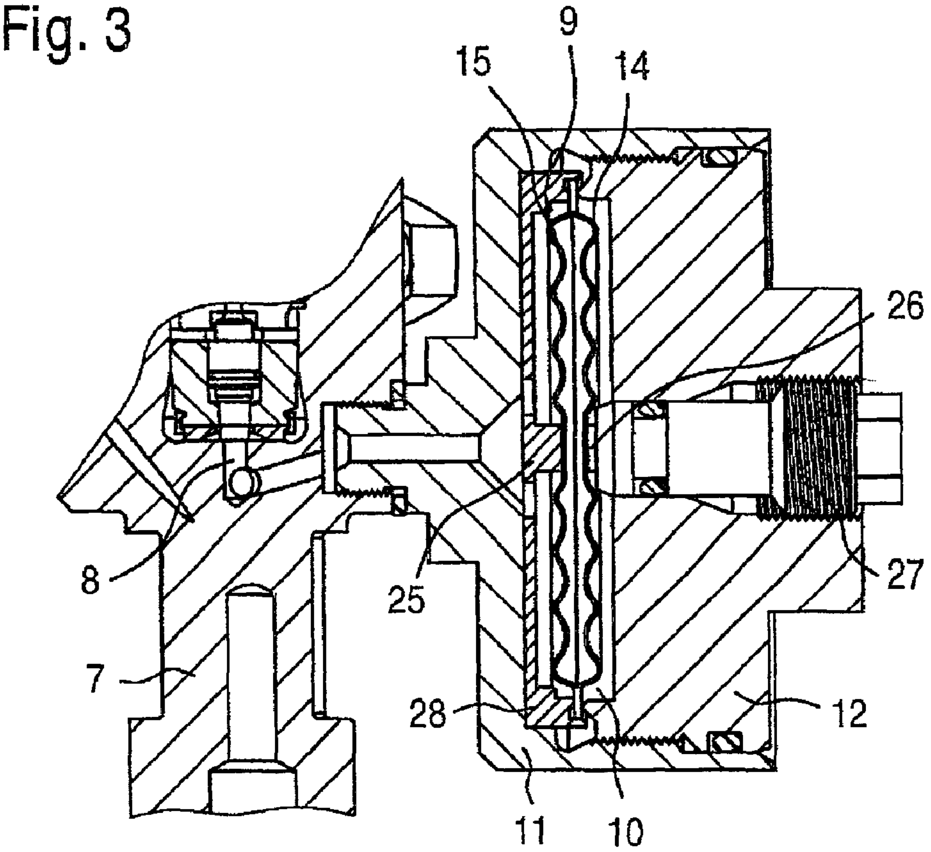
FIG. 3 is a cross section of a fuel injector with means for pressure limitation, in which the means are embodied as a diaphragm cell which is integrated with a damper housing disposed outside the injector body.

FIG. 3 shows a further exemplary embodiment of the means for reducing pressure fluctuations; they include a diaphragm cell 9, which is disposed inside a damper housing 11. The damper housing 11 is in turn disposed on the injector body 7 and both communicates fluidically with it and is connected mechanically to it. The mechanical connection, in the present exemplary embodiment, includes a screw connection, and the fluidic communication with the system of return bores 8 takes place via internal conduits into the recess 10 inside the damper housing 11. The diaphragm cell 9 is received inside the damper housing 11 and is disposed fixedly in it by means of a closure element 12. Diametrically opposite the closure element 12, a receiving element 28 is provided, which is likewise embodied in circular disklike fashion and which has a central stop 25. Inside the closure element 12, a further prestressing element 27 is also provided, which on its end, in the direction of the diaphragm cell 9, has a diametrically opposed stop 26. Thus the stroke limitation of the diaphragm shells 14 and 15 of the diaphragm cell 9 can be limited by the stops 25 and 26. The closure element 12 is screwed in inside the damper housing 11 and is closed in pressuretight fashion by means of seals. The prestressing element 27 is disposed centrally inside the closure element 12 and embodied is as a kind of screw, so that it can be adjusted toward or away from the diaphragm cell by a screwing motion in the direction of the diaphragm cell 9. The centrally disposed stop 25 is embodied on the receiving element 28 and acts counter to the stop 26 of the prestressing element 27. Thus the maximum bulging of the diaphragm shells 14 and 15 can be limited.

Figure 4:
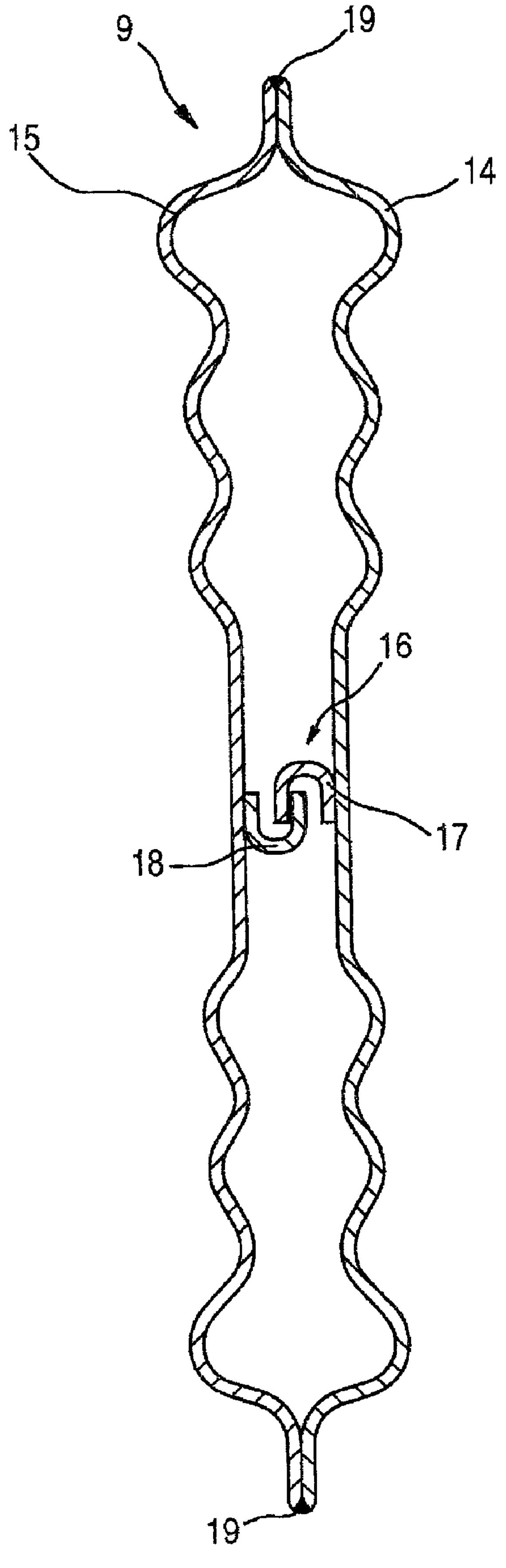
FIG. 4 is a diaphragm cell in accordance with the present invention, which has a symmetrical stroke limiter placed inside it.
Figure 5:
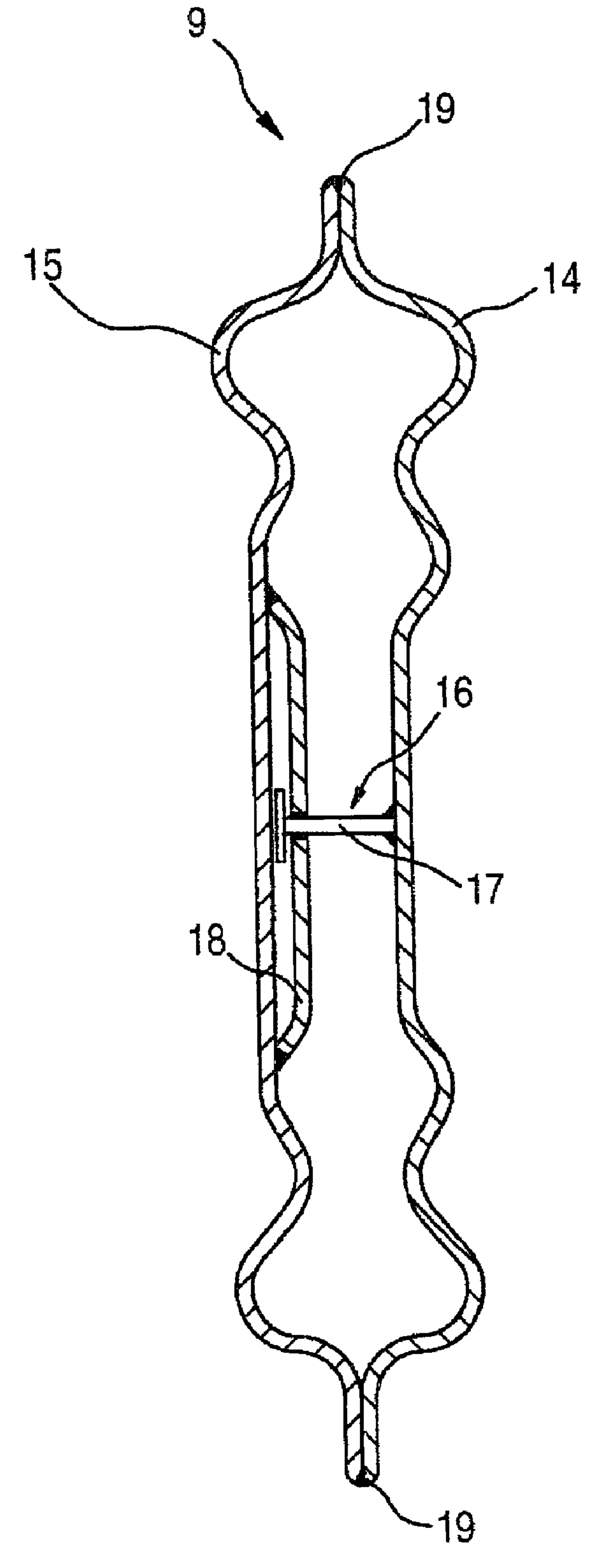
FIG. 5 shows a further exemplary embodiment of the diaphragm cell with a symmetrically embodied stroke limiter placed inside it.

In FIGS. 4 and 5, different embodiments of the stroke limiter 16 in the diaphragm cell 9 are shown. In FIG. 4, the stroke limiter 16 has C-shaped hoop elements 17 and 18, which with one another in such a way that both inward and outward sagging of the diaphragm can be limited. Conversely, in FIG. 5 the stroke limiter is embodied asymmetrically, which represents a further exemplary embodiment of it. This includes a T-shaped hoop element 17 and hoop elements 18 that are each in the shape of brackets and which again mesh with one another and limit both inward and outward sagging of the diaphragm shells 14 and 15. The diaphragm shells 14 and 15 are joined together by a weld seam 19 extending all the way around radially.

Figure 6A:
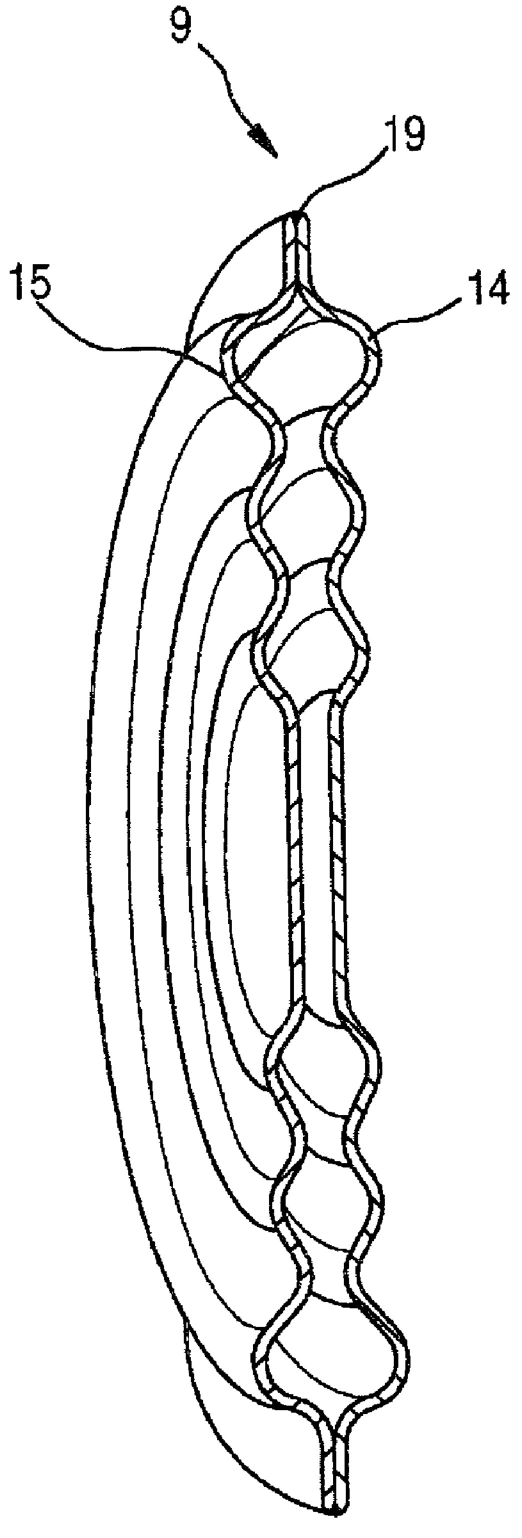
FIG. 6*a* shows a first exemplary embodiment of the diaphragm cell, which has a symmetrical disposition of the diaphragm shells.
Figure 6B:
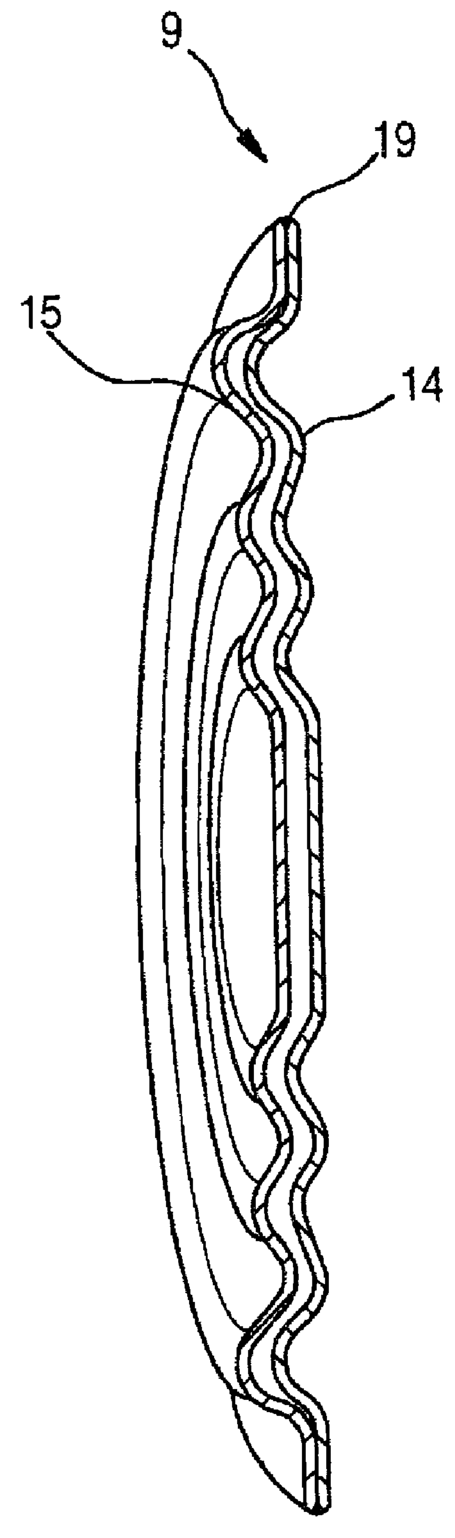
FIG. 6*b* shows a further exemplary embodiment of the diaphragm cell, which has an asymmetrical disposition of the diaphragm shells.

FIGS. 6*a* and 6*b* show a symmetrically and an asymmetrical embodiment of the diaphragm cell 9, respectively. In FIG. 6*a*, the diaphragm shells 14 and 15 are embodied identically to one another, so that they are located in mirror symmetry, rotated by 180° from one another, and are welded to one another. Conversely, in the FIG. 6*b*, the diaphragm shells 14 and 15 have an asymmetrical embodiment, so that the wave structure insides the diaphragm shells extends uniformly, and the overall structural height in the diaphragm cell 9 is reduced. Each of the diaphragm shells 14 and 15 have three saves, embodied concentrically about the center axis of the diaphragm cells 9, although a different number of shafts can also be placed in the diaphragm shells, which depends on the diameter of the diaphragm cell and the thickness of the sheet-metal material of the diaphragm shells. The wave structure enlarges the elastic region for sagging of the diaphragm shells 14 and 15 and essentially avoids damage to or overloading of the diaphragm shells and of the weld seam 19.

The foregoing relates to the preferred exemplary embodiments of the invention, it being understood that other variants and embodiments thereof are possible within the spirit and scope of the invention, the latter being defined by the appended claims.

The invention claimed is:

1. A fuel injector for injecting fuel into a combustion chamber, having a magnet valve for controlling a miniature servo valve, the fuel injector comprising:

a movable armature which sealingly closes a valve seat disposed in a armature chamber;

the miniature servo valve being received in an injector body, the servo valve sealing off a control line from a flat seat, and upon an actuation of the magnet valve, the control line can be relieved of a high fuel pressure to a return pressure by means of the flat seat, into at least one return line;

at least one diaphragm cell which reduces pressure fluctuations in the at least one return line, said diaphragm cell being disposed in a recess that communicates fluidically with the at least one return line;

wherein the diaphragm cell has two circular disk-like diaphragm shells, which are joined in pressuretight fashion to one another radially around in a joined circumference to form the diaphragm cell;

wherein the recess is sealed off in pressuretight fashion by a closure element, and in the recess next to the diaphragm cell, there is a prestressing or receiving element, said prestressing or receiving element mechanically bracing the diaphragm cell against the closure element along the joined circumference of the diaphragm shells; and wherein each of the closure element and the prestressing or receiving element or injector body includes a centrally disposed stop element, which are capable of limiting bulging of the diaphragm shells.

2. The fuel injector as defined by claim 1, wherein the recess is provided in the injector body, so that the diaphragm cell is integrated into the injector body.

3. The fuel injector as defined by claim 1, wherein the recess for receiving the diaphragm cell is received in a separate damper housing, and the damper housing is disposed on the injector housing and communicates fluidically with the return bore.

4. The fuel injector as defined by claim 1, wherein the circular disklike diaphragm shells have a concentric wave structure, in order to increase resilience of the diaphragm shells.

5. The fuel injector as defined by claim 4, wherein the circular disklike diaphragm shells for forming the diaphragm cell are disposed mirror-symmetrically to one another, so that the wave structure of the diaphragm shells extends counter to one another, and the diaphragm cell has a symmetrical embodiment.

6. The fuel injector as defined by claim 4, wherein the circular disklike diaphragm shells for forming the diaphragm cell are disposed parallel to one another, so that the wave structure of the diaphragm shells extends toward a same direction, and the diaphragm cell has an asymmetrical embodiment.

7. The fuel injector as defined by claim 4, wherein the diaphragm cell is filled with helium and has a gas pressure which is greater than the return pressure in the return line or in the recess communicating with the return line.

8. The fuel injector as defined by claim 1, wherein the diaphragm cell is filled with helium and has a gas pressure which is greater than the return pressure in the return line or in the recess communicating with the return line.

9. The fuel injector as defined by claim 1, wherein the diaphragm cell has a stroke limiter, which is placed inside the diaphragm cell.

10. The fuel injector as defined by claim 1, wherein the closure element includes an adjustable prestressing element, said adjustable prestressing element being a kind of screw which can be adjusted toward or away from the diaphragm cell, and wherein the stop element that is on the closure element is located on the adjustable prestressing element.

11. The fuel injector as defined by claim 10, wherein said recess is completely outside the injector body and inside a damper housing which is positioned on the injector body.

12. The fuel injector as defined by claim 11, wherein the damper housing is mechanically connected to the injector body by a screw connection.

13. The fuel injector as defined by claim 1, wherein the diaphragm shells are connected by a weld seam, and wherein the fuel injector further comprises a prestressing element which includes three legs which, by elastic prestressing, both relieve the weld seam and simultaneously keep the diaphragm cell in an open position.

14. The fuel injector as defined by claim 1, wherein said recess is completely outside the injector body and inside a damper housing which is positioned on the injector body.

15. The fuel injector as defined by claim 14, wherein the damper housing is mechanically connected to the injector body by a screw connection.

16. A fuel injector for injecting fuel into a combustion chamber, having a magnet valve for controlling a miniature servo valve, the fuel injector comprising:

a movable armature which sealingly closes a valve seat disposed in an armature chamber;

the miniature servo valve being received in an injector body, the servo valve sealing off a control line from a flat seat, and upon an actuation of the magnet valve, the control line can be relieved of a high fuel pressure to a return pressure by means of the flat seat, into at least one return line;

at least one diaphragm cell which reduces pressure fluctuations in the at least one return line, said diaphragm cell being disposed in a recess that communicates fluidically with the at least one return line;

wherein the diaphragm cell further has a stroke limiter, which is placed inside the diaphragm cell; and wherein the stroke limiter has hoop elements which are disposed meshing with one another, so that the hoop elements limit both diaphragm shell sagging that moves the diaphragm shells together and diaphragm shell sagging that moves the diaphragm shells apart.

17. A fuel injector for injecting fuel into a combustion chamber, having a magnet valve for controlling a miniature servo valve, the fuel injector comprising:

a movable armature which sealingly closes a valve seat disposed in an armature chamber;

the miniature servo valve being received in an injector body, the servo valve sealing off a control line from a flat seat, and upon an actuation of the magnet valve, the control line can be relieved of a high fuel pressure to a return pressure by means of the flat seat, into at least one return line;

at least one diaphragm cell which reduces pressure fluctuations in the at least one return line, said diaphragm cell being disposed in a recess that communicates fluidically with the at least one return line;

wherein the diaphragm cell has two circular disklike diaphragm shells, which are joined in pressuretight fashion to one another radially around in a joined circumference to form the diaphragm cell;

wherein the diaphragm cell has a stroke limiter, which is placed inside the diaphragm cell; and wherein the stroke limiter has hoop elements which are disposed meshing with one another, so that the hoop elements limit both diaphragm shell sagging that moves the diaphragm shells together and diaphragm shell sagging that moves the diaphragm shells apart.

* * * * *